(12) United States Patent
Durbin et al.

(10) Patent No.: US 10,985,819 B1
(45) Date of Patent: Apr. 20, 2021

(54) ELEMENT-LEVEL SELF-CALCULATION OF PHASED ARRAY VECTORS USING INTERPOLATION

(71) Applicant: Anokiwave, Inc., San Diego, CA (US)

(72) Inventors: Jason Durbin, San Diego, CA (US); Nitin Jain, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

(21) Appl. No.: 16/653,334

(22) Filed: Oct. 15, 2019

Related U.S. Application Data

(60) Provisional application No. 62/746,257, filed on Oct. 16, 2018.

(51) Int. Cl.
*H04B 7/06* (2006.01)

(52) U.S. Cl.
CPC ................ *H04B 7/0617* (2013.01)

(58) Field of Classification Search
CPC .... H04B 7/0413; H04L 5/0023; H04L 5/0048
USPC ......................................... 375/299
See application file for complete search history.

(56) References Cited

U.S. PATENT DOCUMENTS

| | | | |
|---|---|---|---|
| 5,027,126 A | 6/1991 | Basehgi et al. | |
| 5,162,803 A | 11/1992 | Chen | |
| 5,448,250 A | 9/1995 | Day | |
| 5,469,851 A * | 11/1995 | Lipschutz | G01S 7/52085 600/447 |
| 5,724,666 A | 3/1998 | Dent | |
| 5,920,278 A | 7/1999 | Tyler et al. | |
| 5,977,994 A * | 11/1999 | Greenberg | G06T 1/60 345/558 |
| 6,021,388 A * | 2/2000 | Otsuka | G10L 13/07 704/268 |
| 6,266,528 B1 | 7/2001 | Farzaneh | |
| 7,087,993 B2 | 8/2006 | Lee | |
| 7,129,568 B2 | 10/2006 | Lee et al. | |
| 8,558,398 B1 | 10/2013 | Seetharam | |
| 8,866,283 B2 | 10/2014 | Chen et al. | |
| 9,077,265 B2 * | 7/2015 | Tsukamoto | H02P 27/08 |
| 9,445,157 B2 | 9/2016 | Barrett | |
| 10,320,093 B2 | 6/2019 | Madsen et al. | |
| 2002/0070895 A1 | 6/2002 | Vail et al. | |
| 2002/0085651 A1 * | 7/2002 | Gu | H04L 27/2679 375/344 |

(Continued)

FOREIGN PATENT DOCUMENTS

| | | |
|---|---|---|
| JP | 2007-178332 A | 7/2007 |
| JP | 2014-036325 A | 2/2014 |
| WO | 2016/022220 A3 | 5/2016 |

OTHER PUBLICATIONS

Bailey, General Layout Guidelines for RF and Mixed-Signal PCBs, Maxim Integrated, Tutorial 5100, 10 pages, Sep. 14, 2011.

(Continued)

*Primary Examiner* — Shuwang Liu
*Assistant Examiner* — Gina M McKie
(74) *Attorney, Agent, or Firm* — Nutter McClennen & Fish LLP

(57) ABSTRACT

This patent application describes systems, devices, and methods for element-level self-calculation of phased array vectors by a beam forming ASIC using interpolation and a look-up table for calculation of phase setting values such as for fast beam steering.

20 Claims, 13 Drawing Sheets

(56) References Cited

U.S. PATENT DOCUMENTS

| | | |
|---|---|---|
| 2005/0017352 A1 | 1/2005 | Lee |
| 2005/0082645 A1 | 4/2005 | Lee et al. |
| 2005/0083797 A1* | 4/2005 | Shigeeda ............... G11B 27/24 369/43 |
| 2005/0098860 A1 | 5/2005 | Lai et al. |
| 2005/0130595 A1 | 6/2005 | Shurvinton et al. |
| 2006/0006505 A1 | 1/2006 | Chiang et al. |
| 2008/0007453 A1 | 1/2008 | Vassilakis et al. |
| 2008/0137482 A1* | 6/2008 | Kang ................... G10K 11/345 367/103 |
| 2008/0268790 A1 | 10/2008 | Shi et al. |
| 2009/0256752 A1 | 10/2009 | Akkermans et al. |
| 2010/0210219 A1 | 8/2010 | Stirling-Gallacher et al. |
| 2011/0198742 A1 | 8/2011 | Danno et al. |
| 2012/0313219 A1 | 12/2012 | Chen et al. |
| 2013/0050055 A1 | 2/2013 | Paradiso et al. |
| 2013/0187830 A1 | 7/2013 | Warnick et al. |
| 2014/0077996 A1 | 3/2014 | Mayo |
| 2014/0210667 A1 | 7/2014 | Wang et al. |
| 2014/0210668 A1 | 7/2014 | Wang et al. |
| 2014/0348035 A1 | 11/2014 | Corman et al. |
| 2015/0325913 A1* | 11/2015 | Vagman ............... H01Q 21/296 342/368 |
| 2016/0248157 A1 | 8/2016 | Rao et al. |
| 2016/0359230 A1 | 12/2016 | Wang et al. |
| 2017/0070258 A1* | 3/2017 | Shih ................... H04L 27/2007 |
| 2017/0230094 A1 | 8/2017 | Da Silva et al. |
| 2017/0237180 A1 | 8/2017 | Corman et al. |
| 2017/0311179 A1 | 10/2017 | Fujio |
| 2018/0019517 A1 | 1/2018 | Allen et al. |
| 2018/0062274 A1 | 3/2018 | Madsen et al. |
| 2018/0331818 A1 | 11/2018 | Aouini et al. |
| 2019/0312359 A1 | 10/2019 | Madsen et al. |
| 2020/0044336 A1* | 2/2020 | Dani .................... B60W 50/00 |

OTHER PUBLICATIONS

International Searching Authority, International Search Report—International Application No. PCT/US2016/052215, dated May 29, 2017, together with the Written Opinion of the International Searching Authority, 17 pages.

International Searching Authority, International Search Report—International Application No. PCT/US2017/042311, dated Oct. 30, 2017, together with the Written Opinion of the International Searching Authority, 9 pages.

International Searching Authority, International Search Report—International Application No. PCT/US2017/048913, dated Jan. 11, 2018, together with the Written Opinion of the International Searching Authority, 14 pages.

Jain, "Layout Review Techniques for Low Power RF Designs," Application Note AN098, Texas Instruments, 15 pages, 2012.

Maxim,—"5GHz, 4-Channel MIMO Transmitter", MAX2850, Maxim Integrated Products, Inc., 33 pages, 2010.

Silicon Labs "Layout Design Guide for the Si4455/435x RF ICs", AN685, Silicon Laboratories, 22 pages, 2014.

Ismail, "Introduction to RF CMOI IC Design for Wireless Applications, Analog VLSI Lab," The Ohio State University, 117 pages, dated Dec. 11, 2001.

* cited by examiner

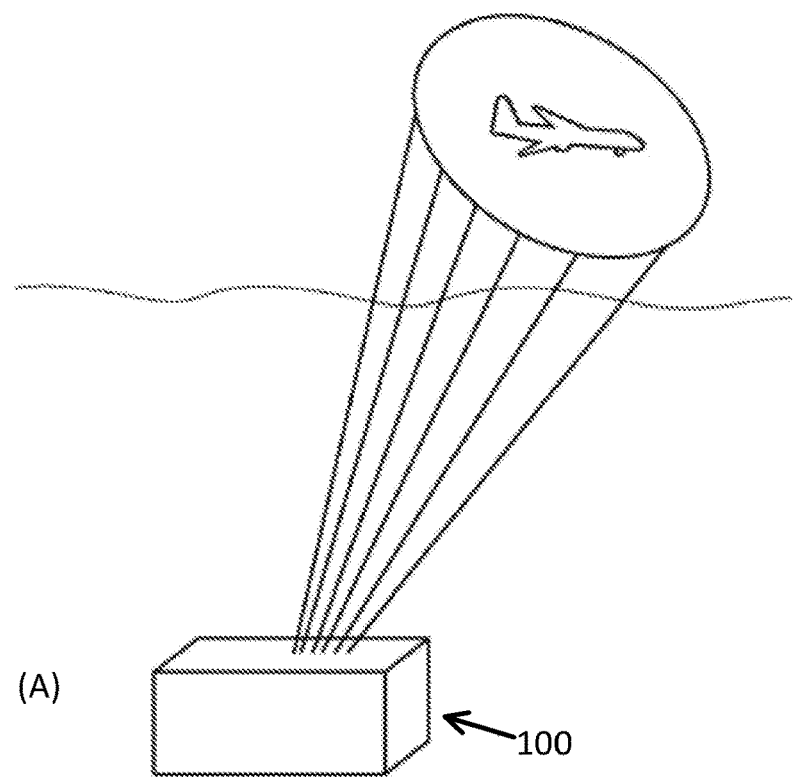
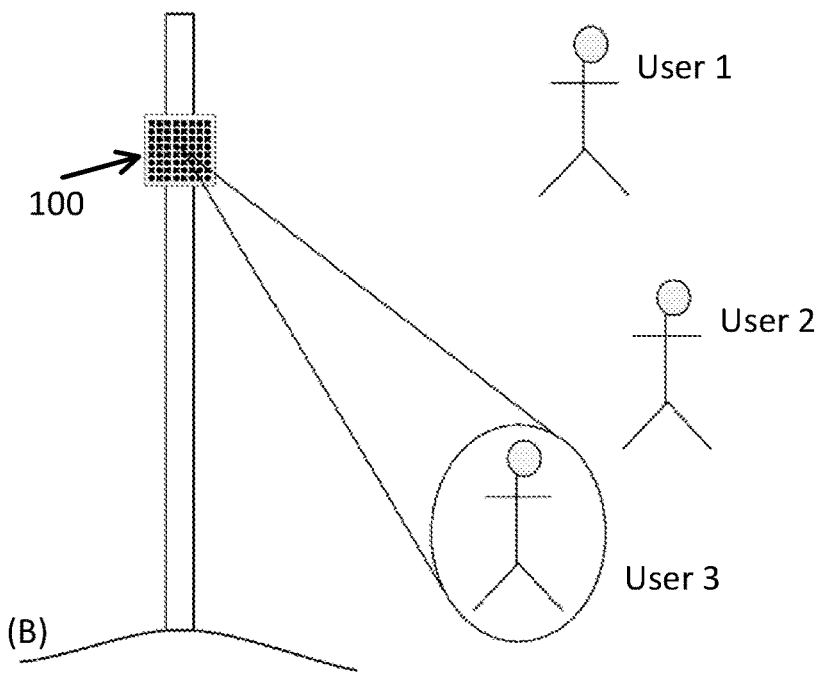
FIG. 1

$$\psi = \frac{2\pi}{\lambda_{task}} \left[ \frac{\lambda_{task}}{2} \sin\theta \cos\phi + \frac{\lambda_{task}}{2} \sin\theta \sin\phi \right] = 180°[\sin\theta\cos\phi + \sin\theta\sin\phi]$$

| θ (°) | φ (°) | ψ_ideal (°) | ψ_{5.625°LSB} (°) |
|---|---|---|---|
| 30 | 6 | 98.914 | 101.25 |
| 42 | 6 | 132.373 | 135.00 |
| 30 | 18 | 113.406 | 112.50 |
| 33.75 | 6 | 109.907 | 106.875 |
| 30 | 12.75 | 107.643 | 106.875 |
| 33.75 | 12.75 | 119.607 | 118.125 |

Look-up table entries (See next slide for δ calculations)

$\Delta\psi_\theta = 135.00° - 101.25° = 33.75°$
$\delta\psi_\theta = 5.625°$ (calc. LSB of 5.625°)
  $= 9.84375°$ (calc. LSB of 1.40625°)

$\psi(33.75°, 6°) = \psi(30°, 6°) + \delta\psi_\theta$
  $= 106.875°$ (LSB 5.625°)
  $= 111.09375°$ (LSB 1.40625°)

$\Delta\psi_\phi = 112.50° - 101.25° = 11.25°$
$\delta\psi_\phi = 5.625°$ (calc. LSB of 5.625°)
  $= 5.625°$ (calc. LSB of 1.40625°)

$\psi(30°, 12.75°) = \psi(30°, 6°) + \delta\psi_\phi$
  $= 106.875° + 5.625° = 112.50°$
  $= 106.875° + 9.84375° = 116.71875°$ $\psi(33.75°, 12.75°) = \psi(30°, 6°) + \delta\psi_\theta + \delta\psi_\phi$
$\psi_{5.625°} = 101.25° + 5.625° + 5.625° = 112.50°$
$\psi_{1.40625°} = 101.25° + 9.84375° + 5.625° = 116.71875°$

FIG. 9

Simple binary multiplication by 2 and division by 2 is a simple shift:

10.125   =   1010.0010
X2       =   10100.010    (shift left, decimal is stationary)
/2       =   101.00010    (shift right, decimal stationary)

Multiplication of two numbers:

2.125 × 7.25       = 15.40625
10.001 × 111.01    = 1111.01101

| | $2^3$ | $2^2$ | $2^1$ | $2^0$ | $2^{-1}$ | $2^{-2}$ | $2^{-3}$ | $2^{-4}$ | $2^{-5}$ | X | $2^3$ | $2^2$ | $2^1$ | $2^0$ | $2^{-1}$ | $2^{-2}$ | $2^{-3}$ | $2^{-4}$ | $2^{-5}$ |
|---|---|---|---|---|---|---|---|---|---|---|---|---|---|---|---|---|---|---|---|
| Left 2 | 1 | 0 | 0 | 0 | 1 | | | | | 1 | 1 | 0 | 0 | 0 | 1 | | | | |
| Left 1 |   | 1 | 0 | 0 | 0 | 1 | | | | 1 |   | 1 | 0 | 0 | 0 | 1 | | | |
| Orig.  |   |   | 1 | 0 | 0 | 0 | 1 | | | 1 |   |   | 1 | 0 | 0 | 0 | 1 | | |
| Right 1 |  |   |   | 1 | 0 | 0 | 0 | 1 | | 0 |   |   |   | 0 | 0 | 0 | 0 | 0 | |
| Right 2 |  |   |   |   | 1 | 0 | 0 | 0 | 1 | 1 |   |   |   |   | 1 | 0 | 0 | 0 | 1 |
| SUM | 1 | 1 | 1 | 1 | 0 | 1 | 1 | 0 | 1 | | | | | | | | | | | |

| | |
|---|---|
| 5.625 | b0 |
| 11.25 | b1 |
| 22.5 | b2 |
| 45 | b3 |
| 90 | b4 |
| 180 | b5 |
| 360 | b6 |
| 360*2 | b7 |
| 360*2² | b8 |
| 360*2³ | b9 |
| 360*2⁴ | b10 |
| 360*2⁵ | b11 |
| 360*2⁶ | b12 |
| 360*2⁷ | b13 |
| 360*2⁸ | b14 |
| 360*2⁹ | b15 |

FIG. 12

| $\psi_{0,F}$ | $\psi_{1,F}$ | $\psi_{2,F}$ | $\psi_{3,F}$ | $\psi_{4,F}$ | $\psi_{5,F}$ | $\psi_{6,F}$ | $\psi_{7,F}$ | $\psi_{8,F}$ | $\psi_{9,F}$ | $\psi_{A,F}$ | $\psi_{B,F}$ | $\psi_{C,F}$ | $\psi_{D,F}$ | $\psi_{E,F}$ | $\psi_{F,F}$ |
|---|---|---|---|---|---|---|---|---|---|---|---|---|---|---|---|
| $\psi_{0,E}$ | $\psi_{1,E}$ | $\psi_{2,E}$ | $\psi_{3,E}$ | $\psi_{4,E}$ | $\psi_{5,E}$ | $\psi_{6,E}$ | $\psi_{7,E}$ | $\psi_{8,E}$ | $\psi_{9,E}$ | $\psi_{A,E}$ | $\psi_{B,E}$ | $\psi_{C,E}$ | $\psi_{D,E}$ | $\psi_{E,E}$ | $\psi_{F,E}$ |
| $\psi_{0,D}$ | $\psi_{1,D}$ | $\psi_{2,D}$ | $\psi_{3,D}$ | $\psi_{4,D}$ | $\psi_{5,D}$ | $\psi_{6,D}$ | $\psi_{7,D}$ | $\psi_{8,D}$ | $\psi_{9,D}$ | $\psi_{A,D}$ | $\psi_{B,D}$ | $\psi_{C,D}$ | $\psi_{D,D}$ | $\psi_{E,D}$ | $\psi_{F,D}$ |
| $\psi_{0,C}$ | $\psi_{1,C}$ | $\psi_{2,C}$ | $\psi_{3,C}$ | $\psi_{4,C}$ | $\psi_{5,C}$ | $\psi_{6,C}$ | $\psi_{7,C}$ | $\psi_{8,C}$ | $\psi_{9,C}$ | $\psi_{A,C}$ | $\psi_{B,C}$ | $\psi_{C,C}$ | $\psi_{D,C}$ | $\psi_{E,C}$ | $\psi_{F,C}$ |
| $\psi_{0,B}$ | $\psi_{1,B}$ | $\psi_{2,B}$ | $\psi_{3,B}$ | $\psi_{4,B}$ | $\psi_{5,B}$ | $\psi_{6,B}$ | $\psi_{7,B}$ | $\psi_{8,B}$ | $\psi_{9,B}$ | $\psi_{A,B}$ | $\psi_{B,B}$ | $\psi_{C,B}$ | $\psi_{D,B}$ | $\psi_{E,B}$ | $\psi_{F,B}$ |
| $\psi_{0,A}$ | $\psi_{1,A}$ | $\psi_{2,A}$ | $\psi_{3,A}$ | $\psi_{4,A}$ | $\psi_{5,A}$ | $\psi_{6,A}$ | $\psi_{7,A}$ | $\psi_{8,A}$ | $\psi_{9,A}$ | $\psi_{A,A}$ | $\psi_{B,A}$ | $\psi_{C,A}$ | $\psi_{D,A}$ | $\psi_{E,A}$ | $\psi_{F,A}$ |
| $\psi_{0,9}$ | $\psi_{1,9}$ | $\psi_{2,9}$ | $\psi_{3,9}$ | $\psi_{4,9}$ | $\psi_{5,9}$ | $\psi_{6,9}$ | $\psi_{7,9}$ | $\psi_{8,9}$ | $\psi_{9,9}$ | $\psi_{A,9}$ | $\psi_{B,9}$ | $\psi_{C,9}$ | $\psi_{D,9}$ | $\psi_{E,9}$ | $\psi_{F,9}$ |
| $\psi_{0,8}$ | $\psi_{1,8}$ | $\psi_{2,8}$ | $\psi_{3,8}$ | $\psi_{4,8}$ | $\psi_{5,8}$ | $\psi_{6,8}$ | $\psi_{7,8}$ | $\psi_{8,8}$ | $\psi_{9,8}$ | $\psi_{A,8}$ | $\psi_{B,8}$ | $\psi_{C,8}$ | $\psi_{D,8}$ | $\psi_{E,8}$ | $\psi_{F,8}$ |
| $\psi_{0,7}$ | $\psi_{1,7}$ | $\psi_{2,7}$ | $\psi_{3,7}$ | $\psi_{4,7}$ | $\psi_{5,7}$ | $\psi_{6,7}$ | $\psi_{7,7}$ | $\psi_{8,7}$ | $\psi_{9,7}$ | $\psi_{A,7}$ | $\psi_{B,7}$ | $\psi_{C,7}$ | $\psi_{D,7}$ | $\psi_{E,7}$ | $\psi_{F,7}$ |
| $\psi_{0,6}$ | $\psi_{1,6}$ | $\psi_{2,6}$ | $\psi_{3,6}$ | $\psi_{4,6}$ | $\psi_{5,6}$ | $\psi_{6,6}$ | $\psi_{7,6}$ | $\psi_{8,6}$ | $\psi_{9,6}$ | $\psi_{A,6}$ | $\psi_{B,6}$ | $\psi_{C,6}$ | $\psi_{D,6}$ | $\psi_{E,6}$ | $\psi_{F,6}$ |
| $\psi_{0,5}$ | $\psi_{1,5}$ | $\psi_{2,5}$ | $\psi_{3,5}$ | $\psi_{4,5}$ | $\psi_{5,5}$ | $\psi_{6,5}$ | $\psi_{7,5}$ | $\psi_{8,5}$ | $\psi_{9,5}$ | $\psi_{A,5}$ | $\psi_{B,5}$ | $\psi_{C,5}$ | $\psi_{D,5}$ | $\psi_{E,5}$ | $\psi_{F,5}$ |
| $\psi_{0,4}$ | $\psi_{1,4}$ | $\psi_{2,4}$ | $\psi_{3,4}$ | $\psi_{4,4}$ | $\psi_{5,4}$ | $\psi_{6,4}$ | $\psi_{7,4}$ | $\psi_{8,4}$ | $\psi_{9,4}$ | $\psi_{A,4}$ | $\psi_{B,4}$ | $\psi_{C,4}$ | $\psi_{D,4}$ | $\psi_{E,4}$ | $\psi_{F,4}$ |
| $\psi_{0,3}$ | $\psi_{1,3}$ | $\psi_{2,3}$ | $\psi_{3,3}$ | $\psi_{4,3}$ | $\psi_{5,3}$ | $\psi_{6,3}$ | $\psi_{7,3}$ | $\psi_{8,3}$ | $\psi_{9,3}$ | $\psi_{A,3}$ | $\psi_{B,3}$ | $\psi_{C,3}$ | $\psi_{D,3}$ | $\psi_{E,3}$ | $\psi_{F,3}$ |
| $\psi_{0,2}$ | $\psi_{1,2}$ | $\psi_{2,2}$ | $\psi_{3,2}$ | $\psi_{4,2}$ | $\psi_{5,2}$ | $\psi_{6,2}$ | $\psi_{7,2}$ | $\psi_{8,2}$ | $\psi_{9,2}$ | $\psi_{A,2}$ | $\psi_{B,2}$ | $\psi_{C,2}$ | $\psi_{D,2}$ | $\psi_{E,2}$ | $\psi_{F,2}$ |
| $\psi_{0,1}$ | $\psi_{1,1}$ | $\psi_{2,1}$ | $\psi_{3,1}$ | $\psi_{4,1}$ | $\psi_{5,1}$ | $\psi_{6,1}$ | $\psi_{7,1}$ | $\psi_{8,1}$ | $\psi_{9,1}$ | $\psi_{A,1}$ | $\psi_{B,1}$ | $\psi_{C,1}$ | $\psi_{D,1}$ | $\psi_{E,1}$ | $\psi_{F,1}$ |
| $\psi_{0,0}$ | $\psi_{1,0}$ | $\psi_{2,0}$ | $\psi_{3,0}$ | $\psi_{4,0}$ | $\psi_{5,0}$ | $\psi_{6,0}$ | $\psi_{7,0}$ | $\psi_{8,0}$ | $\psi_{9,0}$ | $\psi_{A,0}$ | $\psi_{B,0}$ | $\psi_{C,0}$ | $\psi_{D,0}$ | $\psi_{E,0}$ | $\psi_{F,0}$ |

ELEMENT-LEVEL SELF-CALCULATION OF PHASED ARRAY VECTORS USING INTERPOLATION

CROSS-REFERENCE TO RELATED APPLICATION(S)

This patent application claims the benefit of U.S. Provisional Patent Application No. 62/746,257 entitled FAST BEAM STEERING USING INTERPOLATION filed Oct. 16, 2018, which is hereby incorporated herein by reference in its entirety.

The subject matter of this patent application may be related to the subject matter of U.S. patent application Ser. No. 16/653,348 entitled ELEMENT-LEVEL SELF-CALCULATION OF PHASED ARRAY VECTORS USING DIRECT CALCULATION filed on even date herewith, which claims the benefit of U.S. Provisional Patent Application No. 62/746,266 entitled FAST BEAM STEERING USING DIRECT CALCULATION filed Oct. 16, 2018. Each of these patent applications is hereby incorporated herein by reference in its entirety.

The subject matter of this patent application may be related to the subject matter of U.S. patent application Ser. No. 15/253,426 entitled Phased Array Control Circuit filed on Aug. 31, 2016, which is hereby incorporated herein by reference in its entirety.

FIELD OF THE INVENTION

The invention generally relates to phased arrays and, more particularly, the invention relates to phased array control circuitry for fast beam steering.

BACKGROUND OF THE INVENTION

Active electronically steered antenna systems ("AESA systems," a type of "phased array system") form electronically steerable beams for a wide variety of radar and communications systems. To that end, AESA systems typically have a plurality of beam forming elements (e.g., antennas) that transmit and/or receive energy so that the signal on each beam forming element can be coherently (i.e., in-phase and amplitude) combined (referred to herein as "beam forming" or "beam steering"). Specifically, many AESA systems implement beam steering by providing a unique RF phase shift and gain setting (phase and gain together constitute a complex beam weight) between each beam forming element and a beamforming or summation point.

The number and type of beam forming elements in the phased array system can be selected or otherwise configured specifically for a given application. A given application may have a specified minimum equivalent/effective isotropically radiated power ("EIRP") for transmitting signals. Additionally, or alternatively, a given application may have a specified minimum G/T (analogous to a signal-to-noise ratio) for receiving signals, where G denotes the gain or directivity of an antenna, and T denotes the total noise temperature of the receive system including receiver noise figure, sky temperature, and feed loss between the antenna and input low noise amplifier.

SUMMARY OF VARIOUS EMBODIMENTS

In accordance with one embodiment of the invention, a beam forming integrated circuit for managing a plurality of array elements comprises a look-up table storing phase setting values for each of a number of discrete element directions and interpolation circuitry configured to receive an interpolation address specifying an index into the look-up table and interpolation bits defining an interpolation value for each of a number of dimensions and further configured to produce an interpolated phase setting value for an array element based on the interpolation address and the phase setting values stored in the look-up table.

In accordance with another embodiment of the invention, a phased array system comprises a beam forming controller and a beam forming integrated circuit of the type summarized above, wherein the beam forming controller is configured to provide the interpolation address to the beam forming integrated circuit.

In various alternative embodiments of such beam forming integrated circuit and phased array system, the interpolation circuitry may include first circuitry configured to obtain a floor phase setting value for a given dimension from the look-up table based on the index; second circuitry configured to obtain a ceiling phase setting value for the given dimension from the look-up table based on the index; differencing circuitry configured to produce a difference value for the given dimension based on the floor phase setting value and the ceiling phase setting value; scaling circuitry configured to scale the difference value based on interpolation bits for the given dimension; and combining circuitry configured to combine the scaled difference value with the floor phase setting value. The scaling circuitry may include shifting circuitry configured to produce shifted interpolation values based on the interpolation bits. The look-up table may be a two-dimensional table, in which case the interpolation circuitry may be configured to produce a scaled difference value for each of the two dimensions and combine the scaled difference values with the floor phase setting value to produce the interpolated phase setting value. The two dimensions may correspond to spherical coordinates, e.g., theta and phi, or azimuth and elevation. Each interpolation bit may be associated with a distinct value $2^{-n}$ times a fixed angle step value, where n is from 1 to the number of interpolation bits in the interpolation address. The interpolation may be linear interpolation (e.g., discrete gradient interpolation) or non-linear interpolation. The phase setting values may be unwrapped.

In accordance with another embodiment of the invention, a beam forming integrated circuit may include a storage in which phase shift $\psi$ is stored for discrete dwell directions in a tabular form and an interpolator in which intermediate values are obtained using interpolation.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1 schematically shows one exemplary application of a phased array system that may be configured in accordance with illustrative embodiments of the invention.

FIG. 9 shows additional details of interpolation calculations for an exemplary interpolation calculation, in accordance with one exemplary embodiment.

FIG. 11 shows an example digital calculation using binary operations.

FIG. 12 shows an example antenna phase register.

FIG. 13 is a schematic representation of a example two-dimensional look-up table.

FIG. 15 shows detailed δ calculations for the example shown in FIG. 9.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions: As used in this description and the accompanying claims, the following terms shall have the meanings indicated, unless the context otherwise requires:

A "set" includes one or more members.

A "beam forming element" (sometimes referred to simply as an "element") is an element that is used to transmit and/or receive a signal for beam forming. Different types of beam forming elements can be used for different beam forming applications. For example, the beam forming elements may be RF antennas for RF applications (e.g., radar, wireless communication system such as 5G applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals.

For convenience, the term "beam forming" is sometimes abbreviated herein as "BF" and in some contexts is referred to as "beam steering."

In certain exemplary embodiments, fast beam steering (FBS) in a phased array system is implemented using interpolation and a look-up table within the beam forming ASICs 206.

FIG. 1 schematically shows two exemplary applications of phased array systems 100 that may be configured in accordance with illustrative embodiments of the invention. In these examples, the phased array systems 100 implement AESA systems (also identified by reference number "100"), which, as known by those skilled in the art, form a plurality of electronically steerable beams that can be used for a wide variety of applications. For example, the application in FIG. 1(A) is implemented as a radar system in which a beam-formed signal may be directed toward an aircraft or other object in the sky (e.g., to detect or track position of the object), while the application in FIG. 1(B) is implemented as a wireless communication system (e.g., 5G) in which a beam-formed signal may be directed toward a particular user (e.g., to increase the effective transmit range of the AESA system or to allow for greater frequency reuse across adjacent or nearby cells. Of course, those skilled in the art use AESA systems 100 and other phased array systems 100 in a wide variety of other applications, such as RF communication, optics, sonar, ultrasound, etc. Accordingly, discussion of radar and wireless communication systems are not intended to limit all embodiments of the invention.

Figure 2:
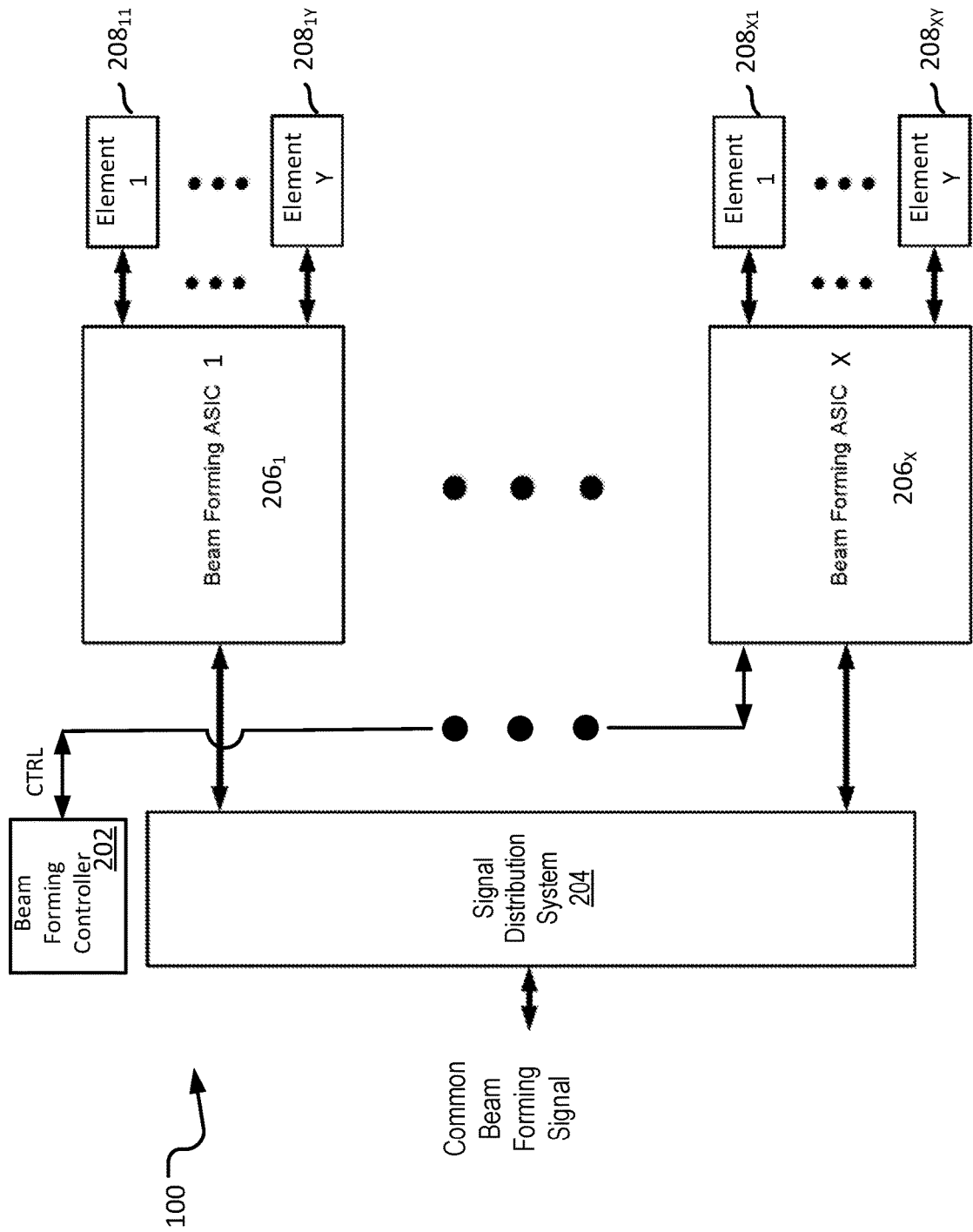
FIG. 2 is a schematic block diagram of the phased array system of FIG. 1, in accordance with certain exemplary embodiments.

FIG. 2 is a schematic block diagram of the phased array system 100 of FIG. 1, in accordance with certain exemplary embodiments. Among other things, the phased array system 100 includes a beam forming controller 202, a signal distribution system 204, and a number of beam forming integrated circuits (ASICs) 206, each of which supports a number of beam forming elements 208 (e.g., RF antennas for operation in the exemplary radar or 5G system). The phased array system 100 includes X beam forming ASICS 206, with each beam forming ASIC 206 supporting Y beam forming elements. Thus, the phased array system 100 includes (X*Y) beam forming elements.

The phased array system 100 of FIG. 2 can be used for transmitting a beam-formed signal via the beam forming elements 208 and/or to produce a beam-formed signal via the beam forming elements 208. Thus, the signal distribution system 204 may be configured to distribute the beam forming signal to each of the beam forming ASICs 206 and/or to produce a combined beam-formed signal from signals received from the beam forming ASICs 206.

Figure 3:
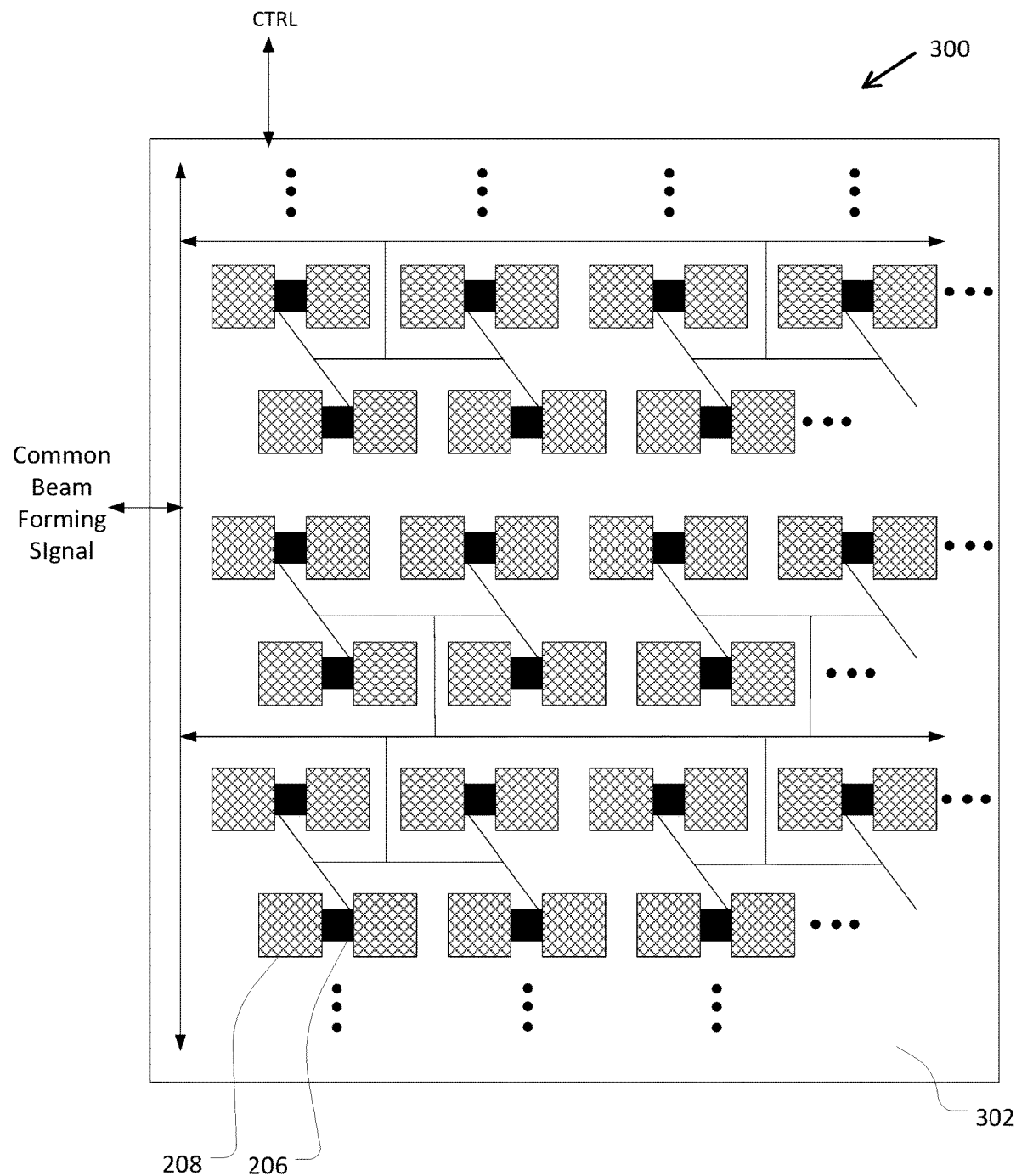
FIG. 3 is a schematic block diagram of a portion of a phased array system configured in accordance with certain illustrative embodiments.

FIG. 3 is a schematic block diagram of a portion 300 of a phased array system 100 configured in accordance with certain illustrative embodiments. Specifically, the portion 300 is implemented as a laminar phased array having a printed circuit board 302 (i.e., a base or substrate) supporting a plurality of beam forming ASICs 206 (represented by the solid black boxes), beam forming elements 208 (represented by the hatched boxes, e.g., RF antennas), and interconnection logic for coupling the beam forming ASICs 206 to the common beam forming signal line(s) and the common control (CTRL) line(s).

In this example, the beam forming elements 208 are formed as a plurality of patch antennas on the laminar printed circuit board 302, although it should be noted that the present invention is not limited to patch antennas or to a laminar printed circuit board. In this example, each beam forming ASIC 206 supports two beam forming elements (e.g., antennas), although in various alternative embodiments, each beam forming ASIC 206 may support one, two, or more beam forming elements (e.g., four beam forming elements per beam forming ASIC). Although only a small number of beam forming ASICs 206 and beam forming elements 208 are shown in the portion 300 of FIG. 3, it should be noted that various alternative embodiments may be configured such that the portion 300 includes a smaller number of beam forming ASICs 206 and/or beam forming elements 208 or may be configured such that the portion 300 includes a larger number of beam forming ASICs 206 and/or beam forming elements 208 (e.g., hundreds or even thousands, of beam forming elements 208). It should be noted that alternative embodiments may be implemented with just the beam forming elements 208 on the printed circuit board 302. It also should be noted that alternative embodiments may be implemented with the beam forming controller 202 and/or the RF power distribution 204 system on the printed circuit board 302. The phased array system 100 can have any of a variety of different types of beam forming elements 208. For example, the phased array system 100 can have one or more transmit-only elements, one or more receive-only elements, and/or one or more dual-mode elements that are capable of both transmitting and receiving signals. For convenience, a beam forming channel that supports a dual-mode beam forming elements may be referred to herein as a "dual-mode beam forming channel" (sometimes also referred to as a "beam forming transceiver channel"). Embodiments typically include all the same type of beam forming element, i.e., either all transmit-only elements, all receive-only elements, or all dual-mode elements, and, furthermore, embodiments that include dual-mode elements typically operate all of the dual-mode elements in the same mode at any given time (e.g., transmit during one phase of operation, receive during another phase of operation, e.g., alternating between transmit and receive modes). However, embodiments may include both transmit-only elements and receive-only elements, in which case it is typical for the transmit-only elements to be operated during one phase of operation and for the receive-only elements to be operated during another phase of operation (e.g., alternating between transmit and receive modes). In some embodiments, transmit and receive modes can operate simultaneously, e.g., having both transmit-only and receive-only elements operating at the same time, or simultaneously having some dual-mode elements configured to transmit and some dual-mode elements configured to receive. The beam forming controller 202 controls the mode and operation of the beam forming ASICs 206 and beam forming elements 208.

As discussed above, each beam forming ASIC 206 supports one or more of the beam forming elements 208. In illustrative embodiments, each beam forming ASIC 206 is configured with at least the minimum number of functions to accomplish the desired effect. Indeed, beam forming ASICs for use with dual-mode elements typically have some different functionality than that of beam forming ASICs for use with transmit-only or receive-only elements. For example, beam forming ASICs for use with dual-mode elements typically include switching circuitry for switching each dual-mode element between a transmitter and a receiver. Accordingly, beam forming ASICs for use with transmit-only or receive-only elements typically have a smaller footprint than beam forming ASICs for use with dual-mode elements.

As an example, depending on its role in the configuration of the phased array system 100, each beam forming ASICs 206 may include some or all of the following functions:

(a) phase shifting,
(b) amplitude controlling/signal weighting,
(c) switching between transmit mode and receive mode,
(d) output amplification to amplify output signals to the beam forming element(s),
(e) input amplification to amplify input signals from the beam forming element(s), and
(f) power combining and splitting between beam forming elements.

Indeed, some embodiments of the beam forming ASICs 206 may have additional or different functionality, although illustrative embodiments are expected to operate satisfactorily with the above noted functions. Those skilled in the art can configure the beam forming ASICs 206 in any of a wide variety of manners to perform those functions. For example, output amplification may be performed by a power amplifier, input amplification may be performed by a low noise amplifier, phase shifting may use conventional phase shifters, and switching functionality may be implemented using conventional transistor-based switches.

Each beam forming ASIC 206 preferably operates on at least one beam forming element 208 in the array. In certain exemplary embodiments, one beam forming ASIC 206 can operate on multiple beam forming elements 208, e.g., two or four beam forming elements 208. Of course, those skilled in the art can adjust the number of beam forming elements 208 sharing a beam forming ASIC 206 based upon the application. Among other things, sharing the beam forming ASICs 206 between multiple beam forming elements 208 in this manner generally reduces the required total number of beam forming ASICs 206, which in some cases may reduce the required size of the printed circuit board 302 (or in some cases allow a greater number of beam forming elements to be placed on the printed circuit board 302), reduce the power consumption of the phased array system 100, and reduce the overall cost of the phased array system 100.

Figure 4:
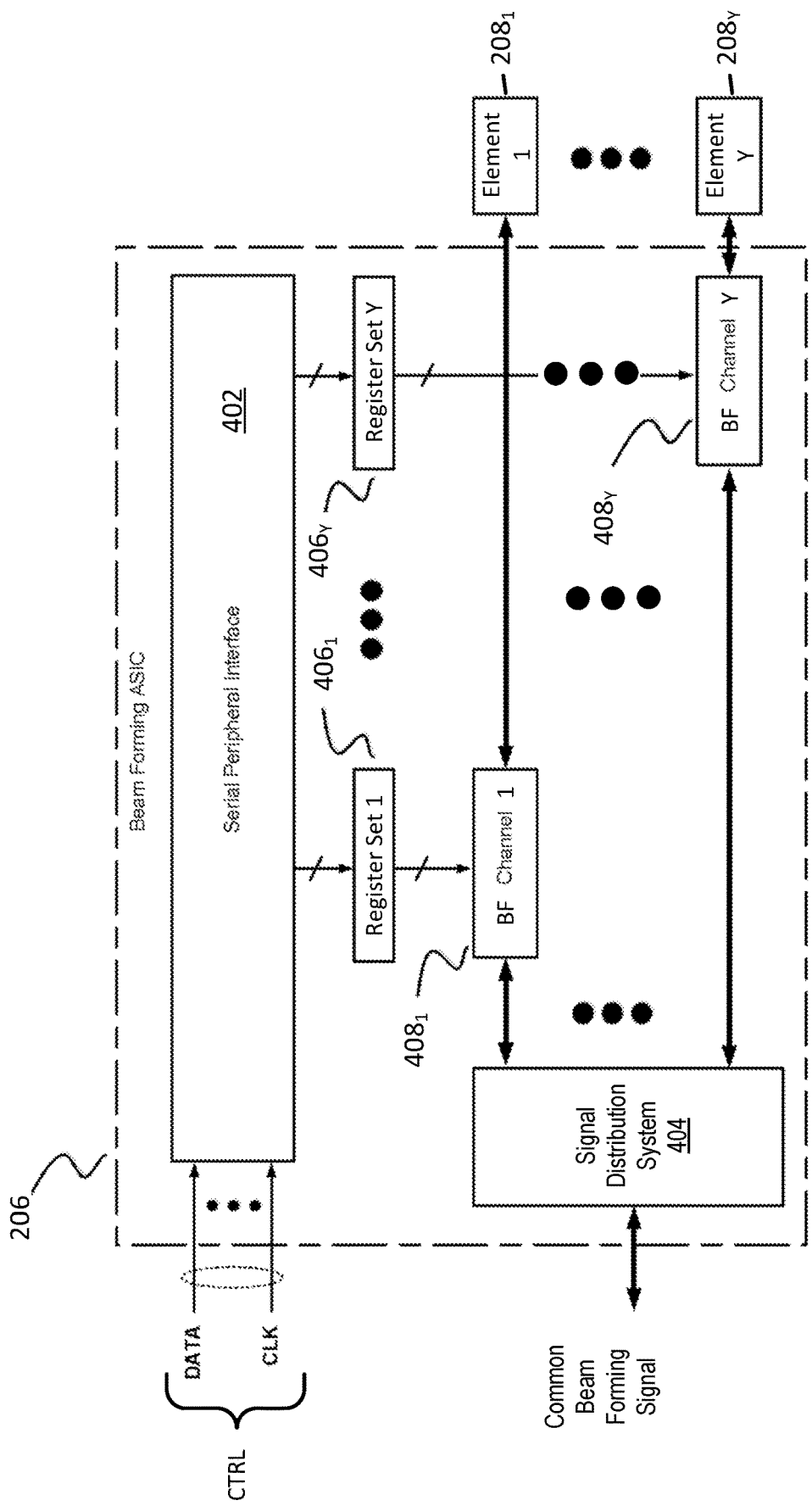
FIG. 4 is a block diagram schematically showing components of a beam forming ASIC, in accordance with certain exemplary embodiments known in the art.

FIG. 4 is a block diagram schematically showing components of a beam forming ASIC 206, in accordance with certain exemplary embodiments known in the art. Among other things, the beam forming ASIC 206 includes a Serial Peripheral Interface (SPI) controller 402 or other appropriate controller for interfacing with the beam forming controller 202 via the control (CTRL) signals, a signal distribution system 404 for distributing the common beam forming signal to and/or from each of Y beam forming channels 408$_1$-408$_Y$, and a register set 406$_1$-406$_Y$ for configuring each of the Y beam forming channels 408$_1$-408$_Y$, respectively. Each register set 406 may include one or more registers for programming the complex beam weight of corresponding beam forming channel 408. For example, each register set 406 may include a single register that is used to store a codeword including both gain/amplitude and phase parameters for the corresponding beam forming channel 408, or each register set 406 may include separate registers that are used to store separate gain/amplitude and phase parameters for the corresponding beam forming channel 408.

Figure 5:
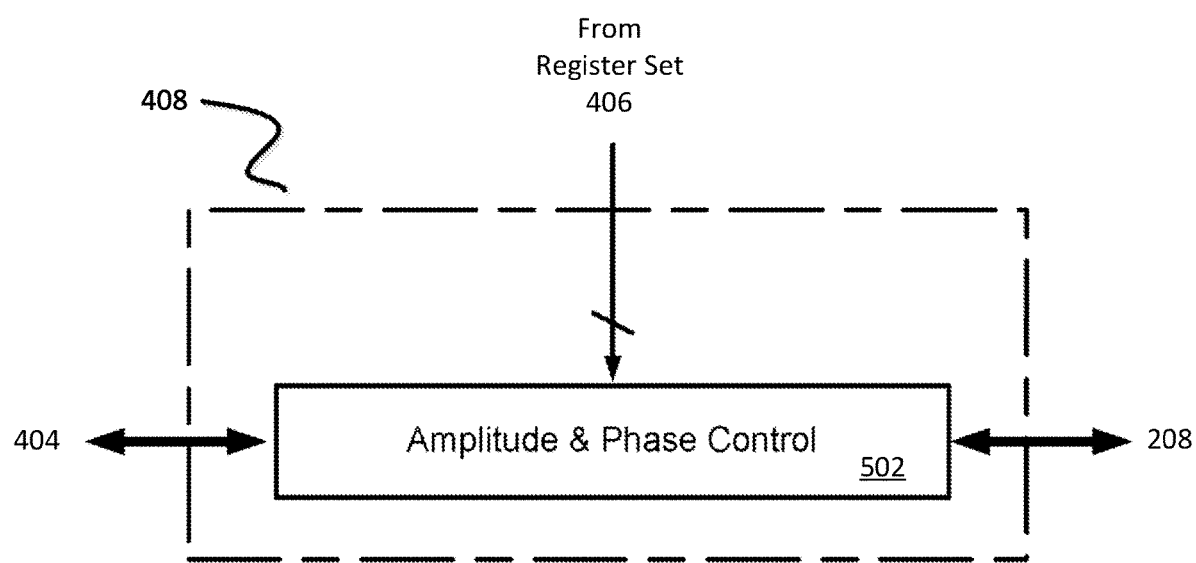
FIG. 5 is a block diagram schematically showing components of a beam forming channel at a high level, in accordance with certain exemplary embodiments.

FIG. 5 is a block diagram schematically showing components of a beam forming channel 408 at a high level, in accordance with certain exemplary embodiments. Among other things, the beam forming channel 408 includes amplitude and phase control circuitry 502 that adjusts the gain/amplitude and phase of the signal to or from the beam forming element 208 based on gain/amplitude and phase parameters from the corresponding register set 406. As discussed above, a beam forming channel 408 may be configured as transmit-only, receive-only, or dual-mode, and phased array systems may be configured with all transmit-only channels, all receive-only channels, all dual-mode channels, or a mix of different types of channels. A transmit-only or dual-mode beam forming channel typically includes transmit path circuitry including a power amplifier, while a receive-only or dual-mode beam forming channel typically includes receive path circuitry including a low noise amplifier. The beam forming channel also may include additional amplifiers and/or buffers (e.g., for adding delay to a signal for phase shifting).

Figure 6:
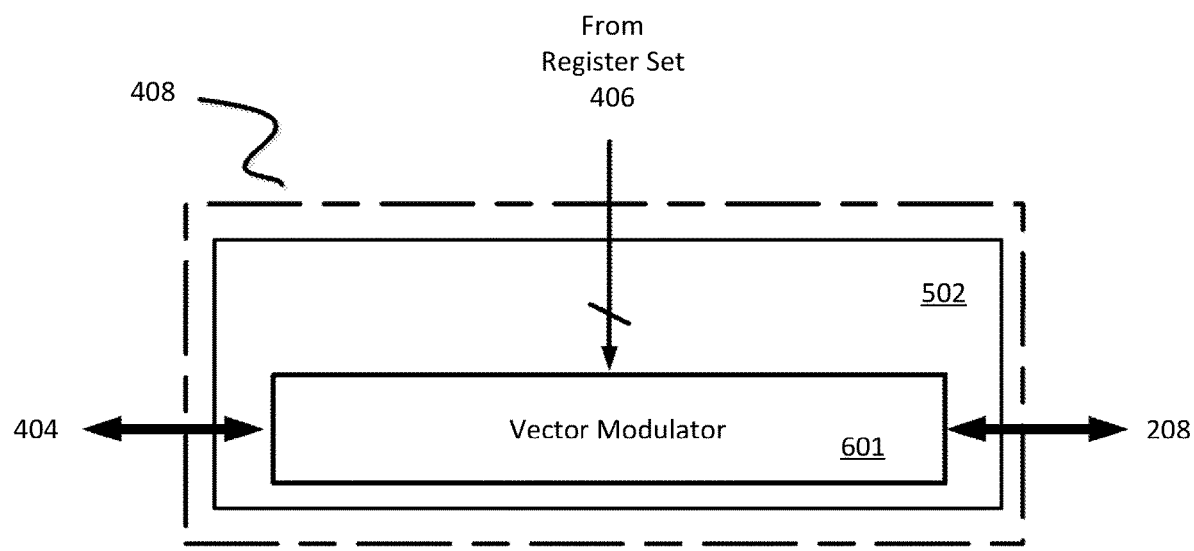
FIG. 6 schematically shows an exemplary architecture of the amplitude and phase control circuitry of a beam forming channel including a single vector modulation circuit, in accordance with certain exemplary embodiments.
Figure 7:
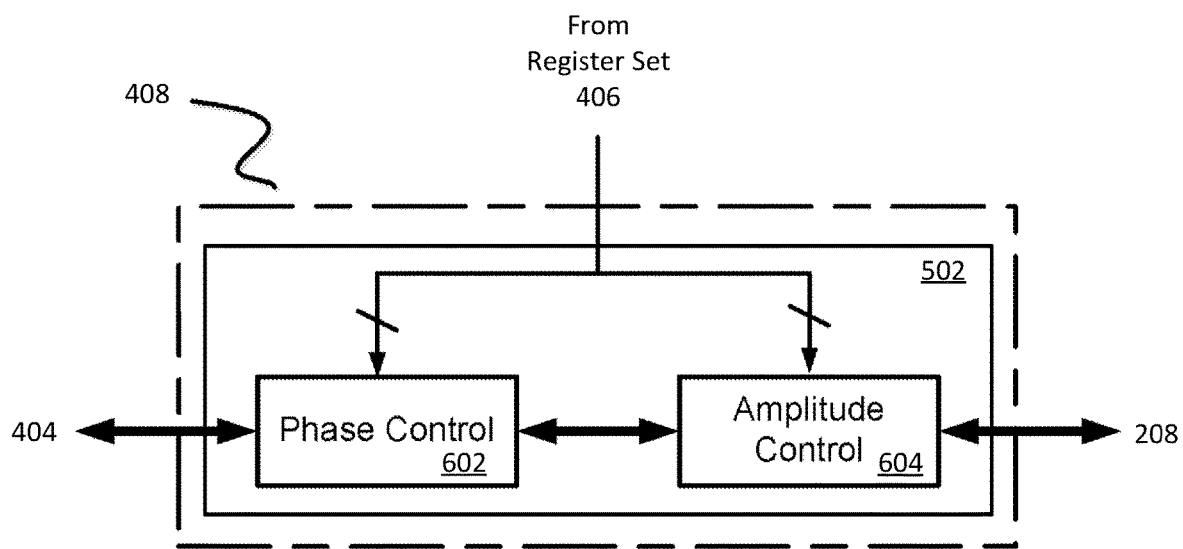
FIG. 7 schematically shows an exemplary architecture of the amplitude and phase control circuitry of a beam forming channel including separate gain/amplitude and phase control circuits, in accordance with certain exemplary embodiments.

FIGS. 6 and 7 schematically show two exemplary architectures of the amplitude and phase control circuitry 502, in accordance with certain exemplary embodiments. In FIG. 6, the amplitude and phase control circuitry 502 includes a vector modulator circuit 601 that adjusts both the amplitude and phase of the signal to or from the beam forming channel 408 based on the gain/amplitude and phase parameters from the corresponding register set 406. In FIG. 7, the amplitude and phase control circuitry 502 includes separate phase control circuitry 602 and amplitude control circuitry 604, where the phase control circuitry 602 adjusts the phase of the signal to or from the beam forming channel 408 based on phase parameters from the corresponding register set 406, and the amplitude control circuitry 604 adjusts the gain/amplitude of the signal to or from the beam forming channel 408 based on gain/amplitude parameters from the corresponding register set 406. As mentioned above, the register set 406 may include a single register that is used to store a codeword including both gain/amplitude and phase parameters for the corresponding beam forming channel 408, in which case the codeword may be decoded to provide phase parameters to the phase control circuitry 602 and gain/amplitude parameters to the amplitude control circuitry 604, or the register set 406 may include separate registers that are used to store separate gain/amplitude and phase parameters for the corresponding beam forming channel 408, in which case the phase parameters from the phase register may be provided to the phase control circuitry 602 and the gain/amplitude parameters from the gain/amplitude register may be provided to the amplitude control circuitry 604.

Figure 8:
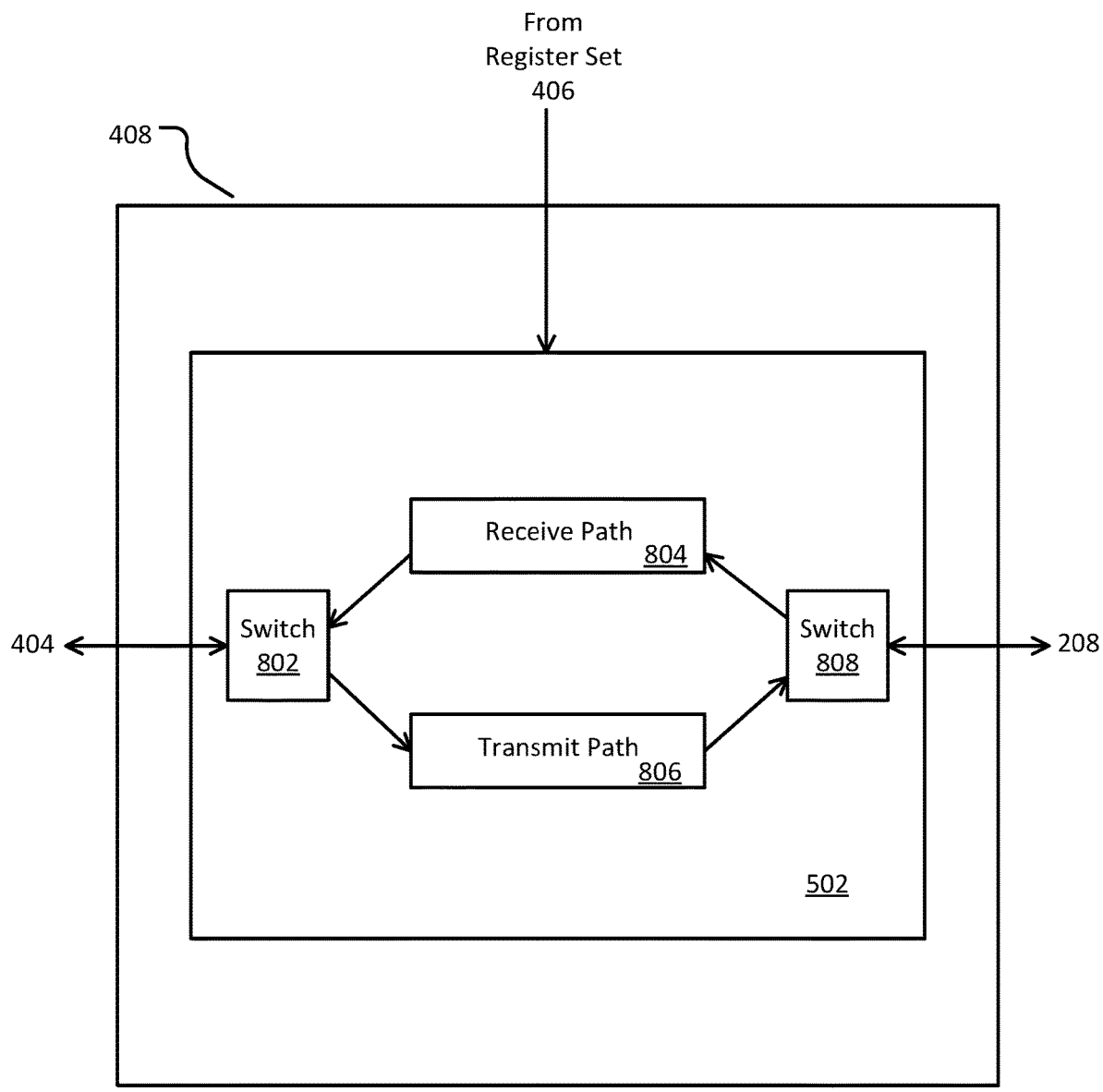
FIG. 8 is a block diagram schematically showing components of the amplitude and phase control circuitry for use with dual-mode elements, in accordance with certain exemplary embodiments.

FIG. 8 is a block diagram schematically showing components of the amplitude and phase control circuitry 502 for use with dual-mode elements, in accordance with certain exemplary embodiments. Among other things, the amplitude and phase control circuitry 502 includes transmit path circuitry 806, receive path circuitry 804, and switches 802 and 808. The transmit path circuitry 806 may be configured substantially as discussed above with reference to FIGS. 6 and 7 for adjusting gain/amplitude and phase of signals being sent to the beam forming element 208 from the signal distribution system 404, while the receive path circuitry 804 may be configured substantially in the reverse of the transmit path circuitry 806 for adjusting gain/amplitude and phase of signals received from the beam forming element 208 and provided to the signal distribution system 404. The transmit path 806 and the receive path 804 may be separate circuits, or, in some embodiments, may include some common circuitry (e.g., the amplitude control circuitry and/or the phase control circuitry may be shared by the two signal paths). In this example, the register set 406 includes, in addition to gain/amplitude parameters and phase parameters, a mode selection parameter to select the mode for the beam forming channel (e.g., transmit mode vs. receive mode). This mode selection parameter is used to control the switches 802 and 808 to select the appropriate signal path, i.e., the transmit path 806 for transmit mode and the receive path 804 for receive mode. The gain/amplitude and phase parameters from the register set 406 are provided to the appropriate signal path. The register set 406 may include a single register that is used to store a codeword including gain/amplitude parameters and phase parameters as well as the mode selection parameter for the corresponding beam forming channel 408, in which case the codeword may be decoded to provide the mode selection parameter to the switches 802 and 808 and to provide phase parameters to phase control circuitry and gain/amplitude parameters to amplitude control circuitry, or the register set 406 may include a separate mode selection register for the mode selection parameter, in which case the mode selection parameter from the mode selection register may be provided to the switches 802 and 808. It should be noted that, in certain alternative embodiments, the switches 802 and 808 may be omitted and instead the mode selection parameter used to enable the appropriate signal path (e.g., power on the selected signal path circuitry and power off the other signal path circuitry).

In addition to the preferred embodiments here, two separate paths, one TX and another RX, may also be used. In this scenario, there is no switch and there may be even two phase shifters for the two paths that may operate simultaneously or independently.

In any case, transmit path circuitry in a transmit-only or dual-mode beam forming channel 408 typically includes a power amplifier, while receive path circuitry in a receive-only or dual-mode beam forming channel 408 typically includes a low noise amplifier. The beam forming channel 408 also may include additional amplifiers and/or buffers (e.g., for adding delay to a signal for phase shifting).

In operation, the beam forming controller 202 configures each register set 406 with beam forming parameters for the corresponding beam forming channel 408 (sometimes referred to as "tasking words" or "phase setting calculations"), such as, for example, phase and gain parameters for the beam forming channel, and, when the beam forming elements 208 are dual-mode elements, optionally also the mode for the beam forming channel (e.g., transmit mode vs. receive mode). In certain implementations, such configuration may involve at least (X*Y) phase setting calculations and write operations (e.g., one phase setting calculation and write operation per beam forming channel).

From time to time, the beam forming controller 202 may need to reconfigure the operation of the phased array system 100, e.g., by switching between transmit mode and receive mode and/or reconfiguring the phase and gain parameters for each of the beam forming elements 208 such as to change the effective shape, directivity, direction, or power of a beam-formed signal. Effectively, the rate of such reconfiguration of the phased array system 100 is limited by the rate at which the beam forming controller 202 can write new parameters to the Y registers in each of the X beam forming ASICs 206. Again, in certain implementations, such reconfiguration may involve at least (X*Y) phase setting calculations and write operations (e.g., one phase setting calculation and write operation per beam forming channel).

Furthermore, if each beam forming channel 408 is reprogrammed upon completion of the write to the corresponding register set 406, then the beam forming channels 408 (or various subsets of the beam forming channels 408) could switch to the new configuration at slightly different times, which could degrade the quality of beam forming operations. This can be remedied, for example, by latching the current codewords being used by the beam forming channels while new codewords are written and then activating all of the new codewords at the same time using a common signal from the beam forming controller 202, although such a mechanism would not change the update time of the system, which still involves writing (X*Y) register sets.

U.S. patent application Ser. No. 15/253,426, which was incorporated by reference above, describes a solution in which, rather than each beam forming ASIC 206 including a single register set for each beam forming channel, each beam forming ASIC includes a register bank including a plurality of register sets for each beam forming channel rather than a single register set for each beam forming channel. The register banks can be preprogrammed with beam forming parameters for multiple potential beam forming operations and then, using switching logic, individual register sets can be sent (via instructions from the beam forming controller 202) simultaneously to their corresponding beam forming channels to effectuate particular beam forming operations (e.g., beam steering). The switching logic can be configured for random access to the register sets of the register banks or for sequential or round-robin access to the register sets of the register banks, typically asynchronously with respect to the SPI interface 402.

The complex beam weight of a given beam forming channel is determined by the parameters presented to the beam forming channel from such switching. A major advantage of such use of register banks over conventional technology is that the beam forming ASICs 206 (and hence the phased array system 100) can switch between register sets at a much higher rate than the beam forming controller 202 can re-program a full complement of register sets across all beam forming ASICs. Thus, switching between different beam forming operations (e.g., switching between a transmit mode and a receive mode, or making adjustments to a beam-formed signal, orientation of the beam, directivity, EIRP, G/T, or DC power) can be accomplished at a much higher rate than in conventional systems. Such fast beam switching is likely to become a critical element of many future phased array systems such as for use in 5G applications and can enable different beam forming on each timing frame of a waveform.

This patent application describes systems, devices, and methods for element-level self-calculation of phased array vectors by the beam forming ASICs 206 using interpolation and a look-up table for calculation of phase setting values such as for fast beam steering.

For single polarization, the phase ($\psi$) of each antenna can be described as:

$$\frac{2\pi}{\lambda_{task}}[x_n \sin\theta\cos\phi + y_n \sin\theta\sin\phi]$$

where ($\psi$) is wrapped between 0 and $2\pi$ by the system calculation. $\theta$ (also called Theta) and $\phi$ (also called Phi) are the spherical coordinates for the beam direction. Element positions can be defined as a fractional multiple (1/h) of the design wavelength/frequency ($\lambda_{design}$). Each element can have a different fraction ($\lambda_{task} > \lambda_{design}$) as follows:

$$\frac{2\pi}{\lambda_{task}}\left[\frac{\lambda_{design}}{h_{x,n}}\sin\theta\cos\phi + \frac{\lambda_{design}}{h_{y,n}}\sin\theta\sin\phi\right]$$

Replacing wavelengths with frequencies for clarity (speed of light cancels out) results in:

$$2\pi F_{task}\left[\frac{1}{h_{x,n}F_{design}}\sin\theta\cos\phi + \frac{1}{h_{y,n}F_{design}}\sin\theta\sin\phi\right]$$

or $$\frac{2\pi}{h_{x,n}}\frac{F_{task}}{F_{design}}\sin\theta\cos\phi + \frac{2\pi}{h_{y,n}}\frac{F_{task}}{F_{design}}\sin\theta\sin\phi$$

where $$\frac{2\pi}{h_{x,n}} \text{ and } \frac{2\pi}{h_{y,n}}$$

are element-dependent but constant (unit: degrees or radians) and $$\frac{F_{task}}{F_{design}}\sin\theta\cos\phi \text{ and } \frac{F_{task}}{F_{design}}\sin\theta\sin\phi$$

are variable but element-independent (always ≤1).

Using the above example, assume a 1024-element array arranged as a 32×32 element square array with a maximum of 1λ apart in the X and Y directions. In this case, the maximum (unwrapped) angle in the X and Y directions is $360°*2*32=360°*2^6 \ll 360°*2^{10}$, and the antenna phase register could be chosen as shown in FIG. 12.

For larger arrays, more bits can be chosen such that the entire phase can be unwrapped throughout the array. If the array can be segmented into sub-arrays, one could take advantage of that to reduce the number of bits. But, in general, the number of bits is large enough so that the entire array can be covered. Here we have shown a 16-bit register or 2-bytes, but that is just one embodiment.

In certain exemplary embodiments, the beam forming ASICs 206 include interpolation circuitry and a look-up table in order to improve performance of the system, such as to reduce the number of phase setting computations that need to be performed by the beam forming controller 202, reduce the number of codewords that need to be transmitted by the beam forming controller 202 to the beam forming ASICs 206, reduce the codeword size, provide greater levels of resolution, and/or reduce register storage on the ASICs. It should be noted that unwrapped phase is used for interpolation in the exemplary embodiments described below.

Assume the phase of the element $\psi$ is tabulated in discrete values. Since $\psi$ is a continuous real function of $\theta$ (theta) and $\phi$ (phi), the derivative of $\psi$ with respect to $\theta$ and $\phi$ can be numerically calculated. The needed shift $\Delta\theta$ and $\Delta\phi$ can then be used to estimate the required $\psi$, quantized, and added to the tabulated value. For example, assuming the whole scan volume is used, let the scan angle range be divided into steps of 12° for the sake of simplification. A look-up table containing phase setting values for the 16 possible angle steps can be stored in the beam forming ASIC 206, for example, as shown in Table 1 (where the first column represents an index value used to obtain the corresponding angle step in the second column, in this example).

TABLE 1

| | |
|---|---|
| 0 | −90 |
| 1 | −78 |
| 2 | −66 |
| 3 | −54 |
| 4 | −42 |
| 5 | −30 |

TABLE 1-continued

| | |
|---|---|
| 6 | −18 |
| 7 | −6 |
| 8 | 6 |
| 9 | 18 |
| 10 | 30 |
| 11 | 42 |
| 12 | 54 |
| 13 | 66 |
| 14 | 78 |
| 15 | 90 |

It should be noted that the index value need not be stored as part of the look-up table.

This is a representative of either θ or ϕ. Based on θ and ϕ), there is unique map defining the required phase shift ψ at each element for each pair composed of θ and ϕ). In this example, there are 256 values of ψ, i.e., ψ ($θ_0$, $ϕ_0$) through ψ ($θ_{15}$, $ϕ_{15}$), which can be pre-stored within the chip, e.g., in a two-dimensional look-up table. FIG. 13 is a schematic representation of a two-dimensional look-up table for values of ψ (θ, ϕ)) in an exemplary embodiment.

In FIG. 13, rows 0-F correspond to index values 0-15 in Table 1 for θ and columns 0-F correspond to index values 0-15 in Table 1 for 4). For example, ψ ($θ_0$, $ϕ_0$) can be associated with a stored value for ψ in row 0, column 0, corresponding to θ=−90° and ϕ=−90°; ψ ($θ_0$, $ϕ_1$) can be associated with a stored value for ψ in row 0, column 1, corresponding to θ=−90° and ϕ=−78°; and so on.

For achieving ψ of a particular scan angle, ($θ_s$, $ϕ_s$), let ($θ_i$, $ϕ_j$) be the "floor state" and ($θ_{i+1}$, $ϕ_{j+1}$) be the "ceiling state" of ($θ_s$, $ϕ_s$). In an exemplary embodiment using Table 1 and FIG. 13, the difference between these two states in either θ or ϕ is 180°/15=12°. In between ($θ_i$, $ϕ_{j+1}$) and ($θ_i$, $ϕ_j$), the differences can be divided into fractions of the step size (e.g., step size=12° in the above example), such as fractions $2^{-1}$, $2^{-2}$, $2^{-3}$, $2^{-4}$, and so on. The difference between ψ ($θ_i$, $ϕ_{j+1}$) and ψ ($θ_i$, $ϕ_j$), which are two adjacent values of ψ in row I, represents how much ψ shifts due to the discrete change in ϕ from the lookup table (i.e., $Δψ_ϕ$). The difference between $ϕ_s$ from $ϕ_j$ in form of shift is then used to scale the $Δψ_ϕ$ and is added into ψ ($θ_i$, $ϕ_j$) to calculate the desired angle ψ ($θ_i$, $ϕ_s$). This is then repeated for $θ_s$ to obtain ψ($θ_s$, $ϕ_s$), i.e., the difference between ψ ($θ_{i+1}$, $ϕ_j$) and ψ ($θ_i$, $ϕ_j$), which are two adjacent values of ψ in column j, represents how much ψ shifts due to the discrete change in θ from the lookup table (i.e., $Δψ_θ$). The difference between $θ_s$ from $θ_i$ in form of shift is then used to scale the $Δψ_θ$ and is added into ψ($θ_i$, $ϕ_j$) to calculate the desired angle ψ($θ_s$, $ϕ_j$).

Thus, an exemplary interpolation address can include (a) an index into the look-up table for obtaining an angle step value and (b) interpolation step(s) to be used in calculating the final phase setting value. The following is one possible interpolation address format, in accordance with one exemplary embodiment:

| S4 ($2^{-4}$) | S3 ($2^{-3}$) | S2 ($2^{-2}$) | S1 ($2^{-1}$) | T3 | T2 | T1 | T0 |
|---|---|---|---|---|---|---|---| where T3-T0 is a four-bit index into the look-up table and S1-S4 are interpolation step bits, where each interpolation step bit is associated with an interpolation step value relative to the angle step value and indicates whether to include the corresponding interpolation step value (e.g., 1=include the corresponding interpolation step value, 0=exclude the corresponding interpolation step value). In this example with an angle step value of 12° as defined in Table 1, S1 represents an interpolation step value of 6° (i.e., 12°×$2^{-1}$), S2 represents an interpolation step value of 3° (i.e., 12°×$2^{-2}$), S3 represents an interpolation step value of 1.5° (i.e., 12°×$2^{-3}$), and S4 represents an interpolation step value of 0.75° (i.e., 12°×$2^{-4}$). It should be noted that the interpolation step values can be computed using binary shifts, e.g., shifting 12 (which is binary 1100) right by one divides by 2 and results in 6°, shifting right by two divides by 4 and results in 3°, and so on. It should be noted that additional interpolation steps can be supported for additional resolutions, e.g., $2^{-5}$, $2^{-6}$, etc. The phase setting value can be computed by adding the value obtained from the look-up table and the included interpolation step values.

Figure 14:
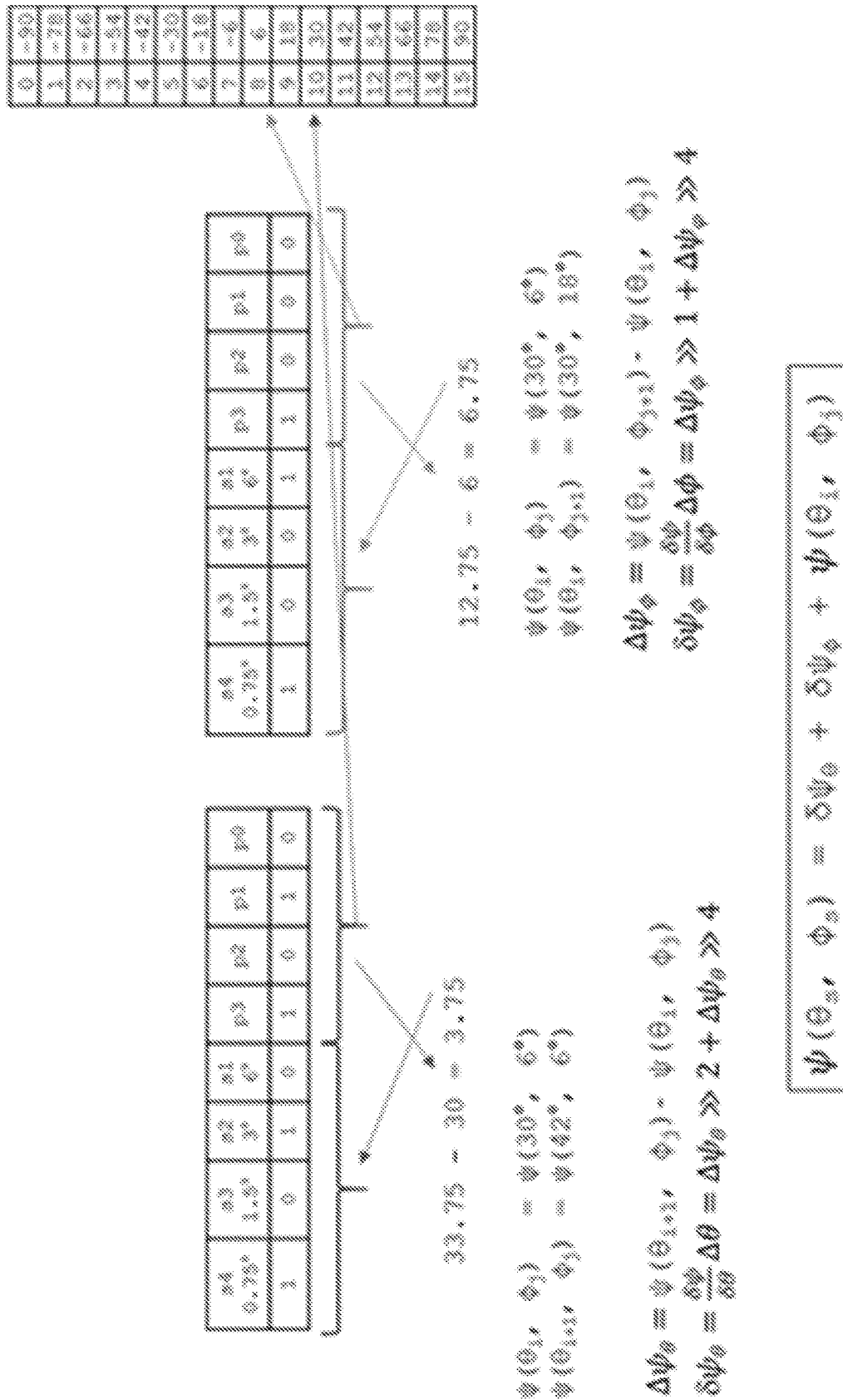
FIG. 14 shows example interpolation addresses for theta and phi.

For example, assuming an array element described in Table 1 and FIG. 13 is to be steered to 33.75° theta and 12.75° phi, then the interpolation addresses for theta and phi for this example are as shown in FIG. 14, where the interpolation address for theta specifies an index value of 10 (i.e., 1010) corresponding to angle 30 and also specifies interpolation step bits 1010 corresponding to an interpolation value of 3.75 for a total of 33.75°, while the interpolation address for phi specifies an index value of 8 (i.e., 1000) corresponding to angle 6 and also specifies interpolation step bits 1001 corresponding to an interpolation value of 6.75 for a total of 12.75°. Thus, for the lefthand computations shown in FIG. 14, the floor state is ψ (30°, 6°) and the ceiling state is ψ (42°, 6°), and for the righthand computations shown in FIG. 14, the floor state is ψ (30°, 6°) and the ceiling state is ψ (30°, 18°). The stored values for ψ(30°, 6°), ψ(42°, 6°), and ψ(30°, 18°) can be retrieved, and then $Δψ_θ$ and $Δψ_ϕ$ can be computed by subtracting the appropriate values. The interpolation values $δψ_θ$ and $δψ_ϕ$ can then be computed based on $Δψ_θ$ and $Δψ_ϕ$ and the interpolation step bits in the corresponding interpolation address, i.e., $δψ_θ=(Δψ_θ>>2+Δψ_θ>>4)$ and $δψ_ϕ=(Δψ_ϕ>>1+Δψ_ϕ>>4)$, where ">>" denotes a bitwise right shift. The final phase setting value for the element can then be computed by combining the theta and phi values, as follows:

$$ψ(θ_s, ϕ_s) = δψ_θ + δψ_ϕ + ψ(θ_i, ϕ_j)$$

It should be noted that the interpolation and final phase setting values can be computed using simple shift and add circuitry, allowing the computations to be done very quickly in hardware.

Figure 15:
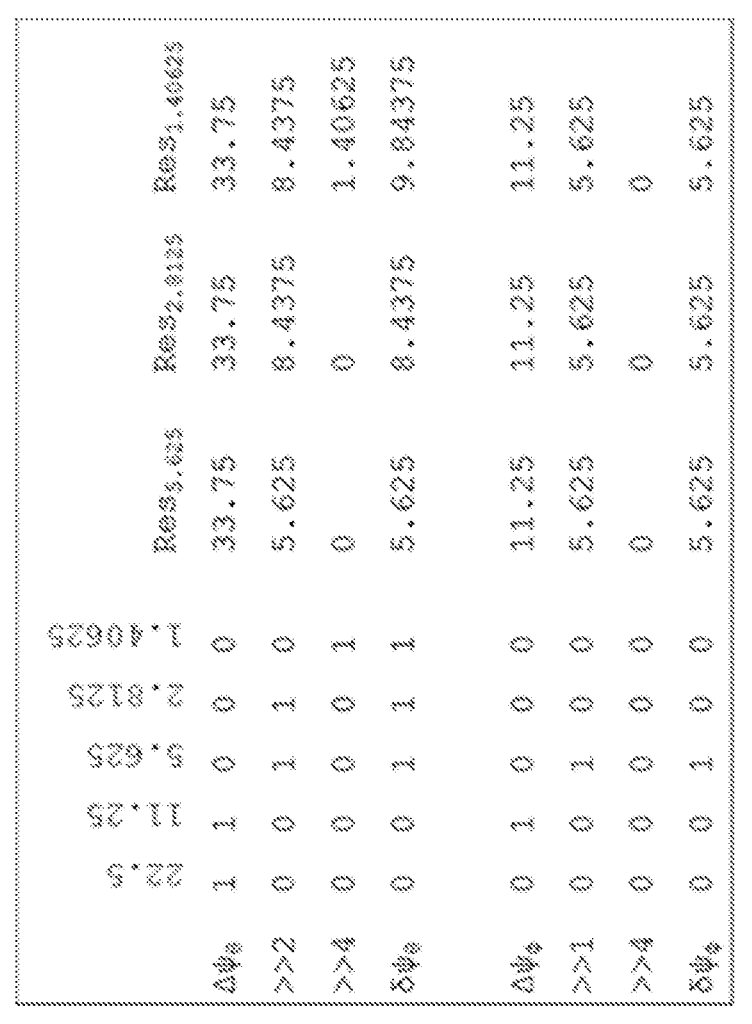

FIG. 9 shows additional details of the interpolation calculations for the above example for an element that is 0.5λ from the center in either direction. It should be noted that neither the array size nor the element position is relevant. FIG. 15 shows detailed δ calculations for the example shown in FIG. 9.

In this embodiment, the phase shift w in the actual circuit is in 360/16=11.25° steps because the phase shifter is built in binary steps from 0 to 360°. However, it also could be built using non-binary steps, but the basic method remains the same. It should be noted that there are various sources of error that can be reduced or eliminated in various alternative embodiments. For example, the difference Δψ as quantized (e.g., ±5.625° or ±1.40625° in the above example) could be improved by adding more bits to the table. The calculation of $δϕ_s+δθ_s$ because of calculation inaccuracy could be improved by adding more calculation bits to catch extra right-shifts, e.g., including LSB/4=2 extra bits. Accuracy due to linearization in interpolation could be improved by having smaller steps.

Figure 10:
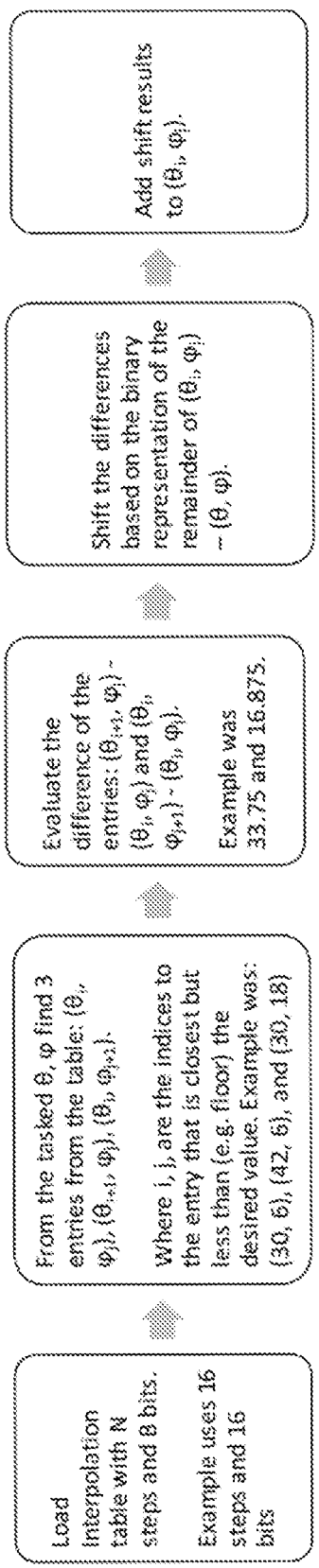
FIG. 10 is a flow diagram for implementation of interpolation with look-up table, in accordance with one exemplary embodiment.

FIG. 10 is a flow diagram for implementation of interpolation with look-up table, in accordance with one exemplary embodiment. The process involves loading the interpolation table with N steps and B bits. The example uses 16 steps and 16 bits. Then, from the tasked θ and ϕ, find 3 entries from the table: $(\theta_i, \phi_j)$, $(\theta_{i+1}, \phi_j)$, $(\theta_i, \phi_{j+1})$, where i, j, are the indices to the entry that is closest but less than (e.g., floor) the desired value. The example was: (30°, 6°), (42°, 6°), and (30°, 18°). Then, evaluate the difference of the entries: $(\theta_{i+1}, \phi_j)-(\theta_i, \phi_j)$ and $(\theta_i, \phi_{j+1})-(\theta_i, \phi_j)$. The example was 33.75° and 16.875°. Then, shift the differences based on the binary representation of the remainder of $(\theta_i, \phi_j)-(\theta, \phi)$ and add the shift results to $(\theta_i, \phi_j)$. The implementation can be summarized as follows:

$$\psi(\theta_i + \Delta\theta, \phi_j + \Delta\phi) = \underbrace{\frac{\delta\psi}{\delta\theta}\Delta\psi_\theta}_{\delta\psi_\theta} + \underbrace{\frac{\delta\psi}{\delta\phi}\Delta\psi_\phi}_{\delta\psi_\phi} + \psi(\theta_i, \phi_j)$$

By way of further example, an angle of −33.75° can be specified using an angle of −42° and an interpolation value of 8.25°, i.e., −42°+8.25°=−33.75°. The following is the interpolation address for −33.75° in accordance with exemplary embodiment described above:

| S4 ($2^{-4}$) | S3 ($2^{-3}$) | S2 ($2^{-2}$) | S1 ($2^{-1}$) | T3 | T2 | Ti | T0 |
|---|---|---|---|---|---|---|---|
| 1 | 1 | 0 | 1 | 0 | 1 | 0 | 0 | where the index value 4 (i.e., 0100) corresponds to angle −42 and the interpolation step bits 1101 correspond to an interpolation value of 8.25° for a total of −33.75°.

FIG. 11 shows an example digital calculation using binary operations. This example shows that multiplication of numbers can be performed using a shift register and addition. Division can be achieved by converting to multiplication (i.e., the reciprocal of the dividing number). Such binary operations can be utilized in the computations described above and can be implemented in hardware using simple hardware logic elements. Thus, certain exemplary embodiments include shifting circuitry (e.g., one or more shift registers) and combining circuitry (e.g., binary addition circuitry) to compute the δψ values and to combine the δψ values with the floor value to produce the interpolated phase setting value.

It should be noted that the δψ values can be produced using other circuitry, such as, for example, registers configured to store pre-shifted values (e.g., omitting shifting circuitry) and combining circuitry configured to selectively combine the pre-shifted values based on the interpolation bits. For example, a computed difference value Δψ containing bits D1 D2 D3 D4 could be stored in registers as follows:

| Register | Pre-Shifted Value | | | | | | |
|---|---|---|---|---|---|---|---|
| R1 = $2^{-1}$ | 0 | D1 | D2 | D3 | D4 | 0 | 0 |
| R2 = $2^{-2}$ | 0 | 0 | D1 | D2 | D3 | D4 | 0 |
| R3 = $2^{-3}$ | 0 | 0 | 0 | D1 | D2 | D3 | D4 |
| R4 = $2^{-4}$ | 0 | 0 | 0 | 0 | D1 | D2 | D3 | D4 |

The registers then could be selectively combined based on the interpolation bits as follows:

δψ=R1 (if S1=1)+R2 (if S2=1)+R3 (if S3=1)+R4 (if S4=1)

Alternatively, for each register, a value of 00000000 could be stored instead of the computed difference value Δψ when loading the register if the corresponding interpolation bit is zero, for example, as follows:

| Register | Interpolation Bit | Pre-Shifted Value | | | | | | |
|---|---|---|---|---|---|---|---|---|
| R1 = $2^{-1}$ | If S1 = 1 | 0 | D1 | D2 | D3 | D4 | 0 | 0 | 0 |
| | If S1 = 0 | 0 | 0 | 0 | 0 | 0 | 0 | 0 | 0 |
| R2 = $2^{-2}$ | If S2 = 1 | 0 | 0 | D1 | D2 | D3 | D4 | 0 | 0 |
| | If S2 = 0 | 0 | 0 | 0 | 0 | 0 | 0 | 0 | 0 |
| R3 = $2^{-3}$ | If S3 = 1 | 0 | 0 | 0 | D1 | D2 | D3 | D4 | 0 |
| | If S3 = 0 | 0 | 0 | 0 | 0 | 0 | 0 | 0 | 0 |
| R4 = $2^{-4}$ | If S4 = 1 | 0 | 0 | 0 | 0 | D1 | D2 | D3 | D4 |
| | If S4 = 0 | 0 | 0 | 0 | 0 | 0 | 0 | 0 | 0 |

The registers then could be combined as follows:

δψ=R1+R2+R3+R4

It should be noted that, while various exemplary embodiments are described above with reference to phased array systems having a plurality of beam forming ASICs (e.g., as depicted in FIG. 2), it is conceivable for all beam forming channels and related circuitry of a phased array system to be implemented on a single beam forming ASIC or substrate and in some cases even for the entire phased array system to be implemented on a single beam forming ASIC or substrate. Additionally, while various exemplary embodiments are described above using uniform spacing (e.g., in Table 1), the implementation is not limited to uniform spacing and can be applied to any array element arrangement such as rectangular, triangular, hexagonal, sparse, or any random or non-uniform arrangement.

It also should be noted that, while various exemplary embodiments are described above with reference to spherical coordinates θ and ϕ for the beam direction, derivations and circuitry can be adapted for other coordinate systems such as azimuth/altitude coordinate systems.

Thus, using fast beam switching control mechanisms as described herein, phased array systems can support a wide range of beam forming operations.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A beam forming integrated circuit for managing a plurality of array elements, the beam forming ASIC comprising a look-up table storing angle values and interpolation circuitry configured to receive an interpolation address having an index into the look-up table and interpolation bits corresponding to an interpolation value and further configured to produce phase taper values for the array elements based on the index, the angle values stored in the look-up table, and the interpolation value.

P2. The beam forming integrated circuit of claim P1, wherein the angle values are separated by a fixed angle step value, and wherein each interpolation bit is associated with a distinct value $2^{-n}$ times the angle step value, where n is from 1 to the number of interpolation bits in the interpolation address.

P3. A beam forming integrated circuit where phase shift $\psi$ is stored for discrete dwell directions, such as $(\theta_i, \phi_j)$, in a tabular form, and where intermediate values are obtained using interpolation.

P4. The beam forming integrated circuit of claim P3, wherein the interpolation is linear interpolation.

P5. The beam forming integrated circuit of claim P4, wherein the linear interpolation uses discrete gradient interpolation.

P6. The beam forming integrated circuit of claim P3, wherein the phase shift $\psi$ is unwrapped.

P7. The beam forming integrated circuit of claim P3, wherein the interpolation is non-linear interpolation.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

Although the above discussion discloses various exemplary embodiments of the invention, it should be apparent that those skilled in the art can make various modifications that will achieve some of the advantages of the invention without departing from the true scope of the invention.

What is claimed is:

1. A beam forming integrated circuit for managing a plurality of array elements, the beam forming integrated circuit comprising:
   a look-up table storing phase setting values for each of a number of discrete element directions; and
   interpolation circuitry configured to receive an interpolation address specifying an index into the look-up table and interpolation bits defining an interpolation value for each of a number of dimensions and further configured to produce an interpolated phase setting value for an array element based on the interpolation address and the phase setting values stored in the look-up table.

2. A beam forming integrated circuit according to claim 1, wherein the interpolation circuitry comprises:
   first circuitry configured to obtain a floor phase setting value for a given dimension from the look-up table based on the index;
   second circuitry configured to obtain a ceiling phase setting value for the given dimension from the look-up table based on the index;
   differencing circuitry configured to produce a difference value for the given dimension based on the floor phase setting value and the ceiling phase setting value;
   scaling circuitry configured to scale the difference value based on interpolation bits for the given dimension; and
   combining circuitry configured to combine the scaled difference value with the floor phase setting value.

3. A beam forming integrated circuit according to claim 2, wherein the scaling circuitry comprises shifting circuitry configured to produce shifted interpolation values based on the interpolation bits.

4. A beam forming integrated circuit according to claim 1, wherein the look-up table is a two-dimensional table, and wherein the interpolation circuitry is configured to produce a scaled difference value for each of the two dimensions and combine the scaled difference values with the floor phase setting value to produce the interpolated phase setting value.

5. A beam forming integrated circuit according to claim 4, wherein the two dimensions correspond to spherical coordinates.

6. A beam forming integrated circuit according to claim 1, wherein each interpolation bit is associated with a distinct value $2^{-n}$ times a fixed angle step value, where n is from 1 to the number of interpolation bits in the interpolation address.

7. A beam forming integrated circuit according to claim 1, wherein the interpolation is linear interpolation.

8. A beam forming integrated circuit according to claim 7, wherein the linear interpolation uses discrete gradient interpolation.

9. A beam forming integrated circuit according to claim 1, wherein the phase setting values are unwrapped.

10. A beam forming integrated circuit according to claim 1, wherein the interpolation is non-linear interpolation.

11. A phased array system comprising:
    a beam forming controller; and
    a beam forming integrated circuit according to claim 1, wherein the beam forming controller is configured to provide the interpolation address to the beam forming integrated circuit.

12. A phased array system according to claim 11, wherein the interpolation circuitry comprises:
    first circuitry configured to obtain a floor phase setting value for a given dimension from the look-up table based on the index;
    second circuitry configured to obtain a ceiling phase setting value for the given dimension from the look-up table based on the index;
    differencing circuitry configured to produce a difference value for the given dimension based on the floor phase setting value and the ceiling phase setting value;
    scaling circuitry configured to scale the difference value based on interpolation bits for the given dimension; and
    combining circuitry configured to combine the scaled difference value with the floor phase setting value.

13. A phased array system according to claim 12, wherein the scaling circuitry comprises shifting circuitry configured to produce shifted interpolation values based on the interpolation bits.

14. A phased array system according to claim 11, wherein the look-up table is a two-dimensional table, and wherein the interpolation circuitry is configured to produce a scaled difference value for each of the two dimensions and combine the scaled difference values with the floor phase setting value to produce the interpolated phase setting value.

15. A phased array system according to claim 14, wherein the two dimensions correspond to spherical coordinates.

16. A phased array system according to claim 11, wherein each interpolation bit is associated with a distinct value $2^{-n}$ times a fixed angle step value, where n is from 1 to the number of interpolation bits in the interpolation address.

17. A phased array system according to claim 11, wherein the interpolation is linear interpolation.

18. A phased array system according to claim 17, wherein the linear interpolation uses discrete gradient interpolation.

19. A phased array system according to claim 11, wherein the phase setting values are unwrapped.

20. A phased array system according to claim 11, wherein the interpolation is non-linear interpolation.

* * * * *